（12）United States Patent
Song (10) Patent No.: US 9,338,709 B2
(45) Date of Patent: May 10, 2016

(54) METHOD AND APPARATUS FOR HANDOVER FROM WIRELESS LOCAL AREA NETWORK TO WIRELESS WIDE AREA NETWORK

(75) Inventor: Kee Ho Song, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 636 days.

(21) Appl. No.: 13/568,513

(22) Filed: Aug. 7, 2012

(65) Prior Publication Data

US 2013/0094475 A1     Apr. 18, 2013

(30) Foreign Application Priority Data

Oct. 18, 2011    (KR) .................. 10-2011-0106224

(51) Int. Cl.
| *H04W 36/00* | (2009.01) |
| *H04L 12/801* | (2013.01) |
| *H04W 36/30* | (2009.01) |
| *H04W 36/14* | (2009.01) |

(52) U.S. Cl.
CPC ........... *H04W 36/0094* (2013.01); *H04L 47/10* (2013.01); *H04W 36/14* (2013.01); *H04W 36/30* (2013.01)

(58) Field of Classification Search
CPC ..... H04W 36/14; H04W 36/30; H04W 88/06; H04W 84/12; H04W 36/0088
See application file for complete search history.

(56) References Cited

U.S. PATENT DOCUMENTS

| 6,510,144 B1 | 1/2003 | Dommety et al. | |
| 2010/0165857 A1* | 7/2010 | Meylan et al. | 370/252 |
| 2010/0304738 A1 | 12/2010 | Lim | |
| 2012/0257512 A1* | 10/2012 | Lim | 370/242 |

FOREIGN PATENT DOCUMENTS

WO     2008/040021 A1    4/2008

* cited by examiner

*Primary Examiner* — Jung Park
(74) *Attorney, Agent, or Firm* — Jefferson IP Law, LLP (57) ABSTRACT

A method for handover from a wireless local area network to a wireless wide area network and an apparatus supporting the method are provided. When channel interference becomes severe during communication with a wireless local area network, the method enables the apparatus to automatically perform handover to a wireless wide area network. The method includes checking integrity of data received from a wireless local area network, determining, if the received data lacks integrity, whether the received data was received within a threshold time, retrieving, if the received data was received within the preset threshold time, an integrity failure count and a retransmission count for the data from a storage unit, and performing, if the integrity failure count exceeds a maximum allowed number of failures and if the retransmission count exceeds a maximum allowed number of retransmissions, handover from the wireless local area network to a wireless wide area network.

20 Claims, 6 Drawing Sheets

METHOD AND APPARATUS FOR HANDOVER FROM WIRELESS LOCAL AREA NETWORK TO WIRELESS WIDE AREA NETWORK

PRIORITY

This application claims the benefit under 35 U.S.C. §119(a) of a Korean patent application filed on Oct. 18, 2011 in the Korean Intellectual Property Office and assigned Serial No. 10-2011-0106224, the entire disclosure of which is hereby incorporated by reference.

BACKGROUND OF THE INVENTION

1. Field of the Invention

The present invention relates to handover from a wireless local area network to a wireless wide area network. More particularly, the present invention relates to a handover method that initiates, when channel interference becomes severe during communication with a wireless local area network, handover to a wireless wide area network and to an apparatus supporting the handover method.

2. Description of the Related Art

IEEE 802.11 refers to a set of standards for implementing Wireless Local Area Networks (WLANs). These standards were created and maintained by the IEEE LAN/MAN Standards Committee (IEEE 802), and provide the basis for Wi-Fi wireless network technologies. There are various handover schemes used in WLANs. For example, handover may be initiated by measurement of signal strength. That is, when the strength of a signal received from the current Wi-Fi network is weak, a mobile station (e.g., a mobile terminal) may measure the strength of a beacon frame signal transmitted by a neighbor access point and initiate soft handoff. As another example, handover may be performed from a WLAN to a Wireless Wide Area Network (WWAN). That is, when a mobile station leaves the coverage of the current WLAN, automatic handover to a WWAN may be performed.

The density with which access points have been installed in recent years may cause problems. For example, communication service providers competitively install their access points in a hotspot zone to attract customers. Dense access points (e.g., access points densely installed among other access points) may cause severe channel interference, which may result in data retransmission or even data loss. Thereby, communication services may be disrupted in the hotspot zone. Hence, in a hotspot zone, it is necessary to support handover from a WLAN to a WWAN. However, existing handover schemes are primarily based on signal strength measurement and may be inadequate for handling channel interference.

SUMMARY OF THE INVENTION

Aspects of the present invention have been made to address the above-mentioned problems and/or disadvantages and to provide at least the advantages described below. Accordingly, an aspect of the present invention is to provide a handover method that automatically initiates, when channel interference becomes severe during communication with a wireless local area network, handover to a wireless wide area network for a continued communication service, and an apparatus supporting the handover method.

In accordance with an aspect of the present invention, a handover method is provided. The method includes checking integrity of data received from a wireless local area network, determining, if the received data lacks integrity, whether the received data was received within a preset threshold time from a preset reference time, retrieving, if the received data was received within the preset threshold time, an integrity failure count and a retransmission count for the received data from a storage unit, and performing, if the integrity failure count exceeds a preset maximum allowed number of failures and if the retransmission count exceeds a preset maximum allowed number of retransmissions, handover from the wireless local area network to a wireless wide area network.

In accordance with another aspect of the present invention, a handover apparatus is provided. The apparatus includes a wireless communication unit for communicating with a wireless local area network and a wireless wide area network, a storage unit for storing an integrity failure count and a retransmission count for data received from the wireless local area network, and a control unit for controlling the wireless communication unit for handover from the wireless local area network to the wireless wide area network, wherein the control unit controls a process of checking integrity of received data, determining, if the received data lacks integrity, whether the received data was received within a preset threshold time from a preset reference time, retrieving, if the data was received within the threshold time, the integrity failure count and the retransmission count for the received data from the storage unit, and performing, if the integrity failure count exceeds a preset maximum allowed number of failures and the retransmission count exceeds a preset maximum allowed number of retransmissions, handover from the wireless local area network to the wireless wide area network.

In accordance with another aspect of the present invention, a handover method is provided. The method includes receiving data from a wireless local area network, determining whether the received data lacks integrity based on a comparison of at least two fields of the received data, determining whether the received data was received within a preset threshold time from a preset reference time, retrieving, if the received data lacks integrity and if the received data was received within the preset threshold time, an integrity failure count and a retransmission count for the received data from a storage unit, and performing, if the integrity failure count exceeds a preset maximum allowed number of failures and if the transmission count exceeds a preset maximum allowed number of retransmissions, a handover from the wireless local area network to a wireless wide area network.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the present invention, a "handover apparatus" refers to a mobile device that includes a wireless communication unit comprising a wireless communication module for local area communication and another wireless communication module for wide area communication. The wireless communication unit is also configured to perform handover between heterogeneous networks. That is, a handover apparatus of the present invention may perform handover from a Wireless Local Area Network (WLAN) to a Wireless Wide Area Network (WWAN). As an example, the WLAN may correspond to a Wi-Fi network, a Bluetooth network, or the like. The WWAN may correspond to a third generation (3G), enhanced third generation (3.5G) or fourth generation (4G) mobile communication network. A mobile communication network may be one of a Global System for Mobile communications (GSM) network, a Code Division Multiple Access (CDMA) network, a Wideband Code Division Multiple Access (WCDMA) network, a World Interoperability for Microwave Access (WiMAX) network, a Long Term Evolution (LTE) network, and a Time Division Synchronous Code Division Multiple Access (TD-SCDMA) network. According to exemplary embodiments of the present invention, the handover apparatus may be any information and communication appliance or multimedia appliance, such as a laptop computer, a Portable Multimedia Player (PMP), a Personal Digital Assistant (PDA), a tablet computer, a mobile terminal, or a smart phone. In the following description, the handover apparatus is assumed to be a smart phone.

Figure 1:
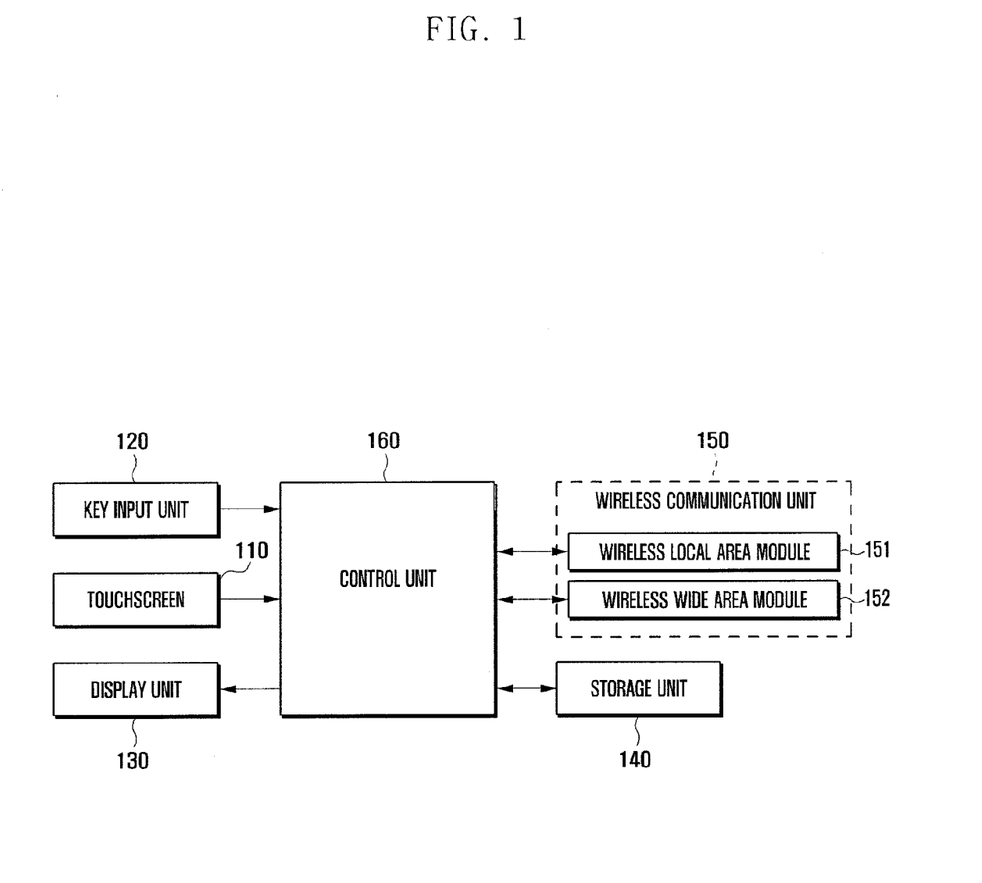
FIG. 1 is a block diagram of a handover apparatus according to an exemplary embodiment of the present invention.

FIG. 1 is a block diagram of a handover apparatus according to an exemplary embodiment of the present invention.

Referring to FIG. 1, the handover apparatus may include a touchscreen 110, a key input unit 120, a display unit 130, a storage unit 140, a wireless communication unit 150, and a control unit 160.

According to exemplary embodiments of the present invention, upon receiving an input from a user, the touchscreen 110 generates a touch event and sends the touch event to the control unit 160. A touch event may correspond to a touch and drop action, a drag and drop action, a flick and drop action, and/or the like. As an example, the touch and drop action may correspond to a pressing of the touchscreen 110 with the finger and a releasing of the finger at the same point; the drag and drop action may correspond to a pressing of the touchscreen 110 with the finger, a moving of the finger in a direction, and a releasing of the finger; and the flick and drop action may correspond to a pressing of the touchscreen 110 with the finger, a moving of the finger quickly in a specific direction, and a releasing the finger. The control unit 160 may distinguish between a flick gesture and a drag gesture based on characteristics of the respective gestures. For example, the control unit 160 may distinguish between the flick gesture and the drag gesture by movement speed. The touch and drop action may be classified into a tap gesture and a press gesture according to the contact maintenance time. That is, the tap gesture is a touch with a short contact maintenance time and the press gesture is a touch with a long contact maintenance time. Touch events may be further classified according to various characteristics. For example, touch events may be classified according to location, direction, distance, and pressure. The touchscreen 110 may include a resistive type, a capacitive type, or a pressure type technology.

The key input unit 120 includes a plurality of keys for manipulating the handover apparatus. The key input unit 120 sends a key event to the control unit 160. As an example, key events may be a power on/off event, a volume control event, and a screen on/off event.

The display unit 130 converts image data from the control unit 160 into an analog signal and displays the analog signal. According to exemplary embodiments of the present invention, under control of the control unit 160, the display unit 130 divides the screen into an indicator region, a main region, and a sub region. The display unit 130 displays indicators for the current time, remaining battery power and signal strength in the indicator region, displays a main screen in the main region, and displays a sub screen in the sub region. As an example, the main screen may be one of a lock screen, a home screen, and an application control screen. The lock screen is displayed when the display unit 130 is turned on. The home screen includes a plurality of icons mapped to various applications. The sub screen may include icons mapped to applications currently executed or frequently used. The sub screen may include menu items for changing main screen settings.

The storage unit 140 stores programs and related data necessary for operation of the handover apparatus. For example, the storage unit 140 may store an operating system, applications, image data, audio data, and video data. The storage unit 140 may comprise a main storage part and a secondary storage part. The main storage part may be realized using a RAM, and the secondary storage part may be realized using a flash memory.

According to exemplary embodiments of the present invention, the main storage part is used to load the operating system and applications. For example, when the handover apparatus is turned on, the operating system is loaded from the secondary storage part onto the main storage part for booting. When an application is invoked, it is loaded from the secondary storage part onto the main storage part for execution; and when execution of the application is ended, the application is removed from the main storage part. The secondary storage part is used to store the operating system and various applications and data. The secondary storage part may be segmented into a data area and a program area. In particular, the data area may store parameters for determining necessity of handover, such as reception time Tnow, threshold time Tyield, reference time Tupt, sequence number of received data, retransmission count, and integrity failure count. Integrity refers to a measure of quality of data received from the network. For example, integrity failure refers to a case in which received data fails to pass a preset integrity test. In other words, integrity failure may correspond to a failure of received data to satisfy a preset quality level. Integrity failure is described in detail later with reference to the drawings. The reference time Tupt may correspond to a point in time at which the handover apparatus makes a request for data through a WLAN. The handover apparatus receives the requested data from the WLAN. If the received data fails the integrity test, then the handover apparatus may update the reference time Tupt with the reception time Tnow of the received data.

The wireless communication unit 150 sends and receives signals for communication related to SMS text messages, MMS multimedia messages, voice calls, video calls, and data calls. The wireless communication unit 150 converts data from the control unit 160 into an analog signal, converts the analog signal into a radio frequency signal, amplifies the radio frequency signal, and transmits the amplified radio frequency signal to a communication network. The wireless communication unit 150 receives a radio frequency signal from a communication network, low-noise amplifies the received radio frequency signal, converts the radio frequency signal into an analog signal, converts the analog signal into data, and forwards the data to the control unit 160. The wireless communication unit 150 includes a wireless local area module 151 for access to a wireless local area network such as a Wi-Fi network, and a wireless wide area module 152 for access to a wide area mobile network such as a 3G or 4G mobile communication network, and the like.

The control unit 160 controls the overall operation of the handover apparatus and controls signal exchange between internal components thereof. In particular, the control unit 160 controls the wireless local area module 151 to access a wireless local area network. According to exemplary embodiments of the present invention, while connected with the WLAN, the control unit 160 executes a handover determining algorithm. When handover criteria are met, the control unit 160 performs handover from the WWLAN to a WWAN. An example of the handover determining algorithm is described in detail with reference to FIGS. 2 to 5.

Figure 2:
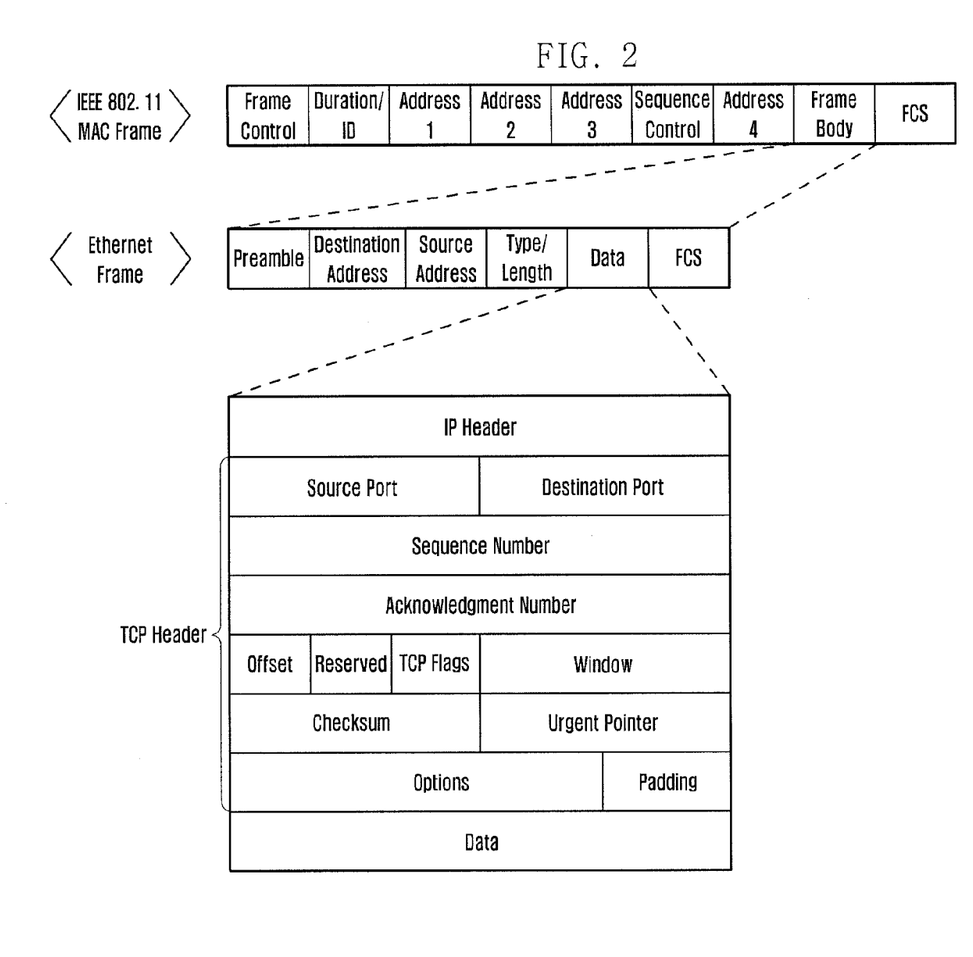
FIG. 2 illustrates a MAC frame structure of IEEE 802.11 according to an exemplary embodiment of the present invention.

FIG. 2 illustrates a structure of a MAC frame in the IEEE 802.11 standard according to an exemplary embodiment of the present invention.

IEEE 802.11 MAC frames are used in wireless communication. A MAC frame includes a MAC header and a frame body. As shown in FIG. 2, the MAC header includes fields for frame control, duration/ID, address 1, address 2, address 3, sequence control, address 4, frame body, and Frame Check Sequence (FCS). The FCS field is used for an integrity check. For example, the control unit 160 may compute an FCS value by subdividing the MAC frame except for the FCS field into 4-byte segments and summing values of the 4-byte segments. The control unit 160 determines whether the MAC frame has integrity based on a comparison of the computed FCS value corresponding to the summation of the 4-byte segments of the MCS frame except for the FCS field with the FCS field. For example, the control unit 160 may determine that the MAC frame has integrity when the computed FCS value (e.g., the value corresponding to the summation of the 4-byte segments of the MCS frame except for the FCS field) is equal to the FCS field value. The frame body field may contain an Ethernet frame, which may be used for wired communication. An Ethernet frame includes an Ethernet header, a data field and an FCS field. The Ethernet header includes fields for preamble, destination address, source address, and type/length. The FCS field is used to check integrity of the Ethernet frame. The data field may contain an IP header, TCP header and data.

Figure 3:
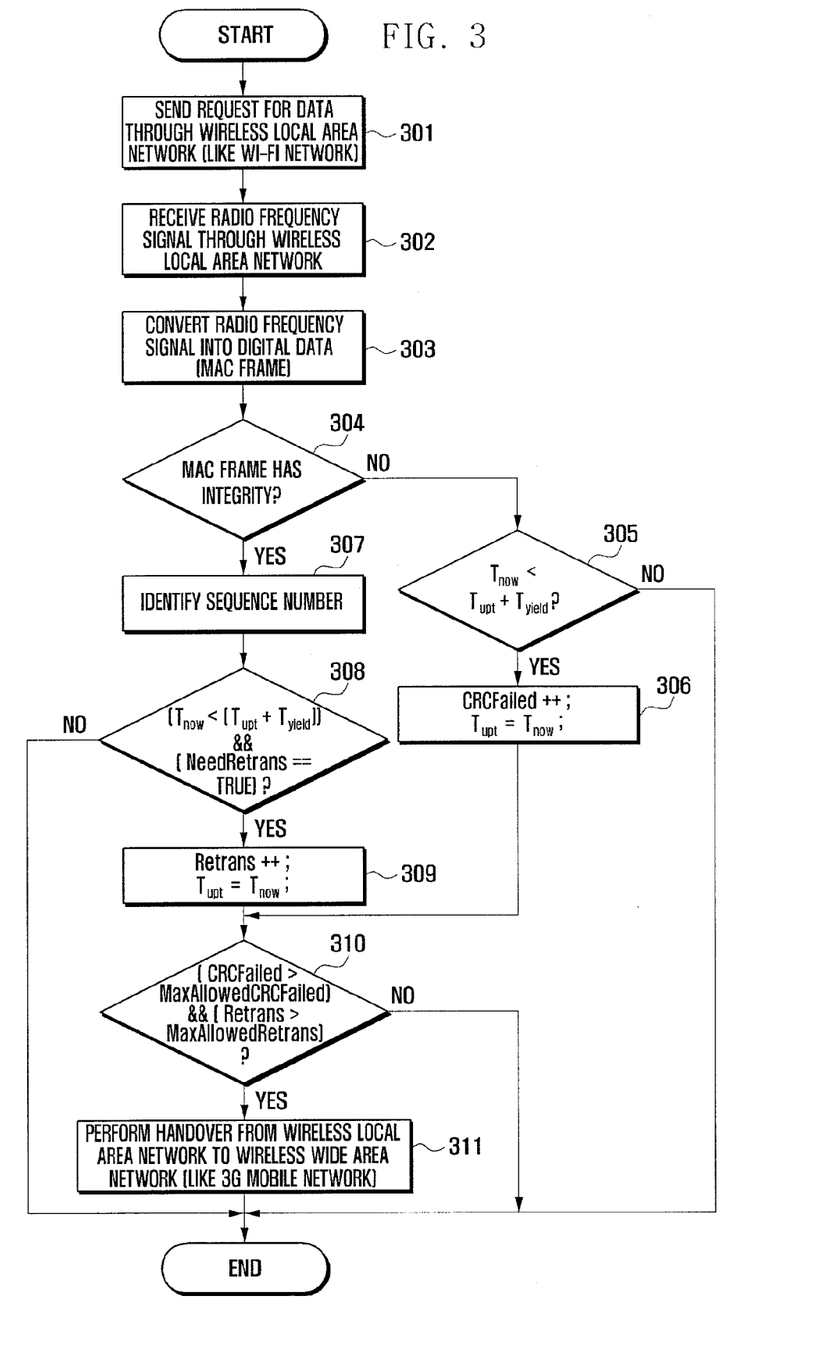
FIG. 3 is a flowchart of a handover method according to another exemplary embodiment of the present invention.

FIG. 3 is a flowchart of a handover method according to another exemplary embodiment of the present invention.

Referring to FIG. 3, the control unit 160 controls the wireless local area module 151 to send a request for data to a WLAN at step 301. The wireless local area module 151 receives a radio frequency signal from the WLAN at step 302. The wireless local area module 151 converts the radio frequency signal into digital data (e.g., a MAC frame) and forwards the digital data (e.g., the MAC frame) to the control unit 160 at step 303. The control unit 160 determines whether the received digital data (e.g., the MAC frame) has integrity on the basis of at least one field (e.g., the FCS) of the digital data (e.g., the MAC frame) at step 304. In other words, the control unit 160 determines whether the MAC frame has integrity on the basis of the FCS of the MAC frame.

If the MAC frame fails the integrity check, the control unit 160 determines whether the MAC frame has been received within a threshold time at step 305.

Figure 4:
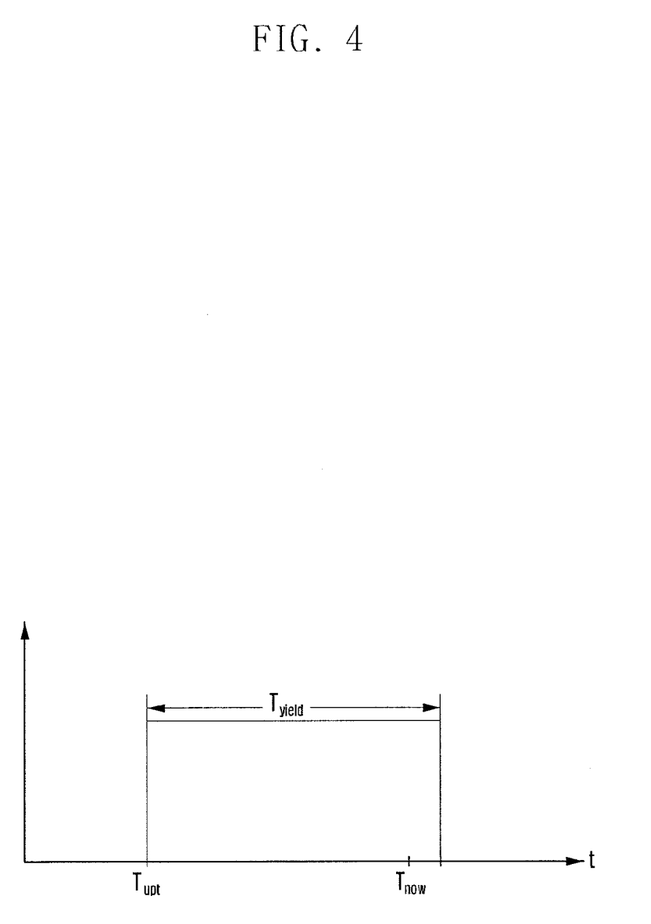
FIG. 4 is a graph used to determine the data reception time in a handover method according to an exemplary embodiment of the present invention.

FIG. 4 is a graph used to determine the data reception time in a handover method according to an exemplary embodiment of the present invention.

Referring to FIG. 4, FIG. 4 may be used to determine whether data is received within a threshold time. Specifically, referring to FIGS. 3 and 4, the control unit 160 identifies the reception time Tnow of the MAC frame, and determines whether the reception time Tnow is less than the reference time Tupt plus the threshold time Tyield. In other words, the control unit 160 identifies the reception time Tnow of the MAC frame, and the control unit 160 determines whether the reception time Tnow occurred within a time period defined by the reference time Tupt and a time occurring at a threshold time Tyield after the reference time Tupt. If the MAC frame has been received within the threshold time Tyield, then at step 306, the control unit 160 increases the integrity failure count (CRCFailed) by 1, updates the reference time Tupt with the reception time Tnow, and proceeds to step 310. If the MAC frame has been received after expiration of the threshold time Tyield, then the control unit 160 may end the handover procedure as to the current MAC frame. This is because data arrival may have been delayed by a problem in the WLAN (i.e., not by channel interference).

If the MAC frame has passed the integrity check, then the control unit 160 identifies the sequence number in the TCP header of the MAC frame at step 307. The control unit 160 determines whether the MAC frame has been received within the threshold time Tyield with respect to the reference time Tupt and retransmission of the MAC frame is needed at step 308. As an example, necessity of MAC frame retransmission may be determined by comparing the sequence number of the current MAC frame with a sequence number stored in the storage unit 140. When the MAC frame has been received within the threshold time Tyield and the sequence number of the MAC frame matches the stored sequence number (i.e., a sequence number of the previously received MAC frame), then at step 309, the control unit 160 increases the retransmission count (Retrans) by one, updates the reference time Tupt with the reception time Tnow, and proceeds to step 310. If the MAC frame has been received after expiration of the threshold time Tyield or the sequence number of the MAC frame does not match the stored sequence number, then the control unit 160 may end the handover procedure as to the current MAC frame. If the sequence number of the MAC frame does not match the stored sequence number, then the control unit 160 updates the stored sequence number with the sequence number of the current MAC frame.

The control unit 160 determines whether the integrity failure count exceeds a maximum allowed number of failures and whether the retransmission count exceeds failure count does not exceed the maximum allowed number of failures or the retransmission count does not exceed the maximum allowed number of retransmissionsa maximum allowed number of retransmissions at step 310. If the integrity failure count does not exceed the maximum allowed number of failures or the retransmission count does not exceed the maximum allowed number of retransmissions, then the control unit 160 ends the handover procedure as to the current MAC frame. If the integrity failure count exceeds the maximum allowed number of failures and if the retransmission count exceeds the maximum allowed number of retransmissions, then the control unit 160 performs handover from the WLAN to a WWAN at step 311. That is, the control unit 160 discontinues communication through the wireless local area module 151 and controls the wireless wide area module 152 to communicate with a WWAN.

As described above, according to the handover method of exemplary embodiments of the present invention, when a mobile device experiences frequent failures in data integrity check and frequent data retransmission owing to severe channel interference in spite of strong electric fields during communication with a WLAN, the mobile device is automatically handed over from the WLAN to a WWAN.

Figure 5:
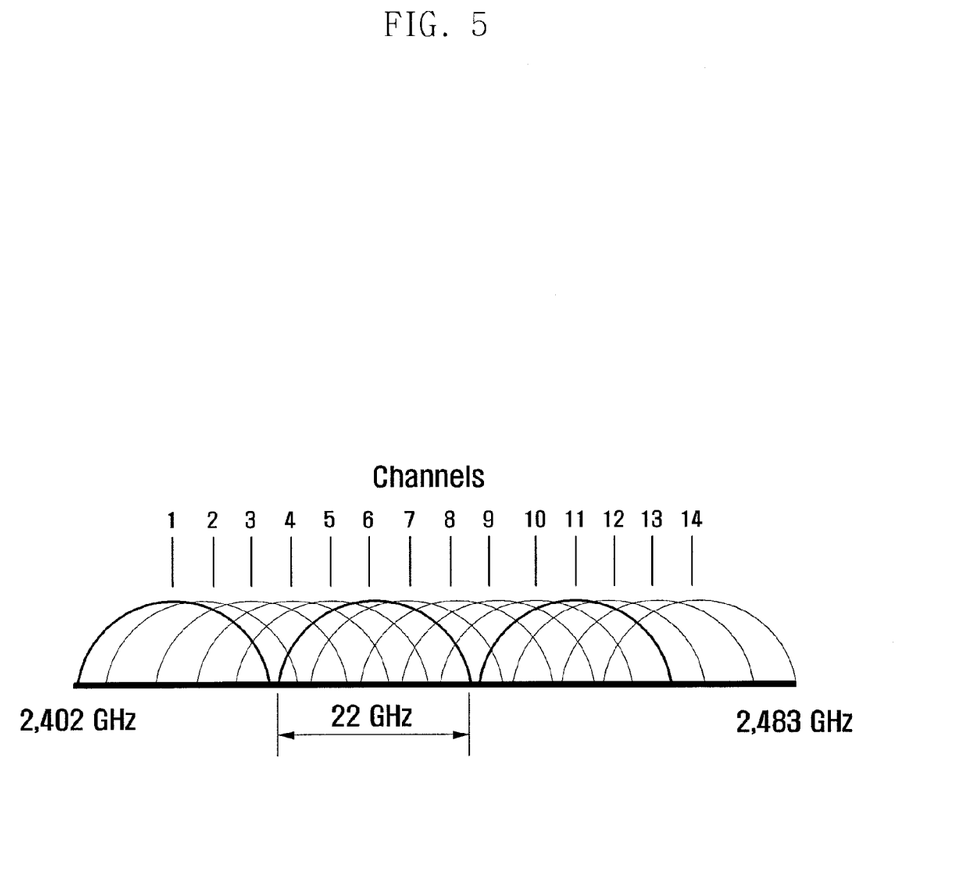
FIG. 5 illustrates Wi-Fi channels according to the IEEE 802.11 standard according to an exemplary embodiment of the present invention.

FIG. 5 illustrates Wi-Fi channels according to the IEEE 802.11 standard according to an exemplary embodiment of the present invention.

Referring to FIG. 5, IEEE 802.11 uses a 2.4 GHz band; the 2.4 GHz band is divided into 14 channels spaced 5 MHz apart; and each channel is 22 MHz wide. As shown in FIG. 5, Wi-Fi channels need not be independent and may overlap. Hence, when four or more access points are installed in the same hotspot zone, channel interference may be encountered. A hotspot zone indicates a public place such as, for example, an airport, a coffee shop, and the like, that is visited by many people. Communication service providers competitively install in a hotspot zone access points respectively corresponding to the communication service provided by the communication service providers. Consequently, a density of access points may cause frequent integrity check failures and frequent data retransmission, which disrupt smooth communication between mobile devices and access points. In such environments, a mobile device supporting the handover method according to exemplary embodiments of the present invention may automatically perform handover from a WLAN to a WWAN.

Figure 6:
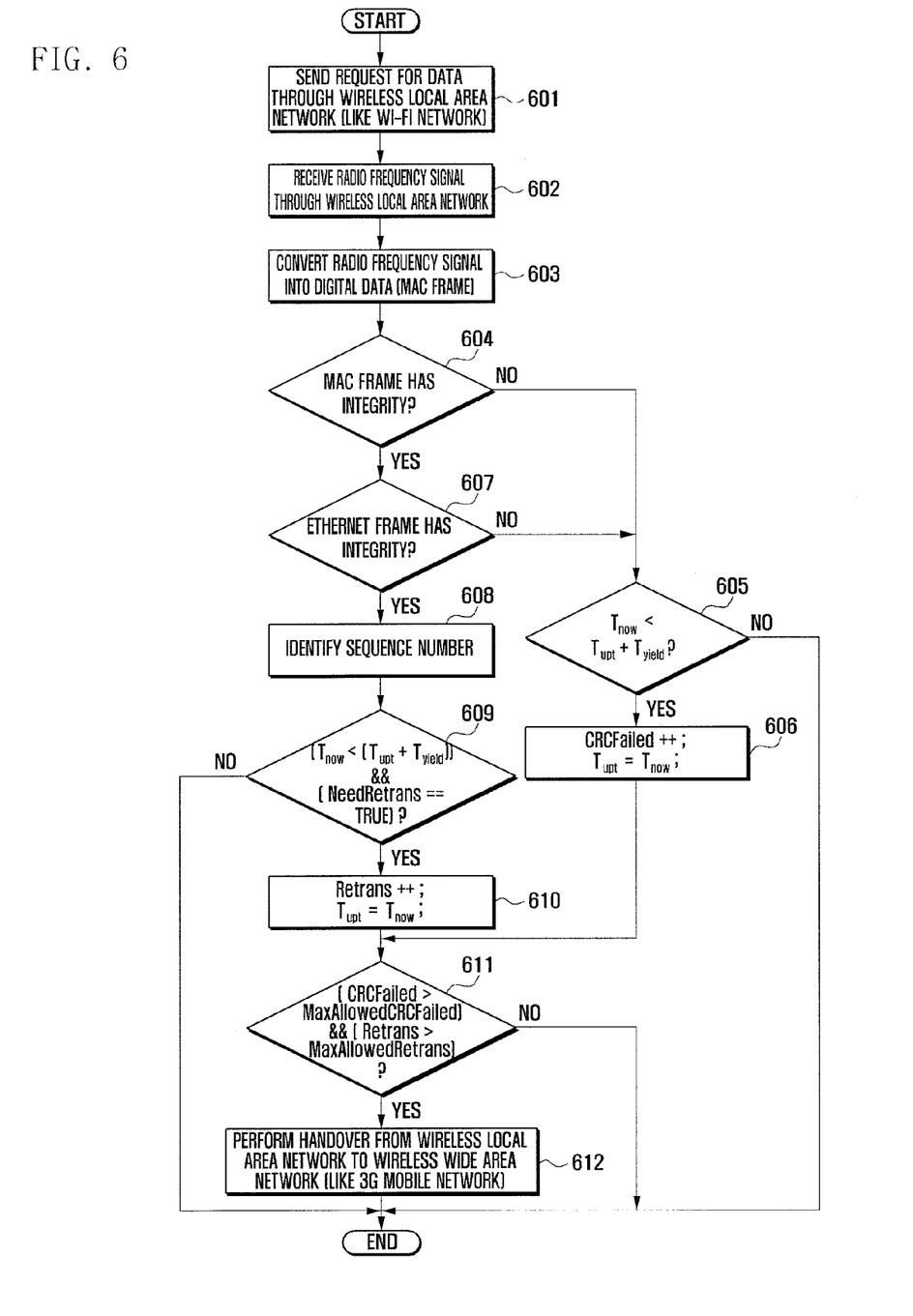
FIG. 6 is a flowchart of a handover method according to an exemplary embodiment of the present invention.

FIG. 6 is a flowchart of a handover method according to an exemplary embodiment of the present invention.

Referring to FIG. 6, the control unit 160 controls the wireless local area module 151 to send a request for data to a WLAN at step 601. The wireless local area module 151 receives a radio frequency signal from the WLAN at step 602. The wireless local area module 151 converts the radio frequency signal into digital data (e.g., MAC frame) and forwards the digital data (e.g., the MAC frame) to the control unit 160 at step 603. The control unit 160 determines whether the received digital data (e.g., the MAC frame) has integrity on the basis of at least one field (e.g., the FCS of the MAC frame) at step 604. In other words, the control unit 160 determines whether the MAC frame has integrity on the basis of the FCS of the MAC frame. If the MAC frame has failed the integrity check, then at step 605, the control unit 160 identifies the reception time Tnow of the MAC frame and determines whether the reception time Tnow is less than the reference time Tupt plus the threshold time Tyield (i.e., whether the MAC frame has been received within the threshold time Tyield). In other words, the control unit 160 identifies the reception time Tnow of the MAC frame, and the control unit 160 determines whether the reception time Tnow occurred within a time period defined by the reference time Tupt and a time occurring at a threshold time Tyield after the reference time Tupt. If the MAC frame has been received within the threshold time Tyield, then at step 606, the control unit 160 increases the integrity failure count (CRCFailed) by 1, updates the reference time Tupt with the reception time Tnow, and proceeds to step 611. If the MAC frame has been received after expiration of the threshold time Tyield, then the control unit 160 may end the handover procedure as to the current MAC frame.

If the MAC frame has passed the integrity check (e.g., based on the determination at step 604), the control unit 160 determines whether the Ethernet frame in the MAC frame has integrity on the basis of the FCS of the Ethernet frame header at step 607. If the Ethernet frame has failed the integrity check, then the control unit 160 proceeds to step 605. If the Ethernet frame has passed the integrity check, then the control unit 160 identifies the sequence number in the TCP header at step 608. The control unit 160 determines whether the MAC frame has been received within the threshold time Tyield with respect to the reference time Tupt and the sequence number of the MAC frame matches the sequence number stored in the storage unit 140 at step 609. If the MAC frame has been received within the threshold time Tyield and if the sequence number of the MAC frame matches the stored sequence number, then at step 610 the control unit 160 increases the retransmission count (Retrans) by one, updates the reference time Tupt with the reception time Tnow, and proceeds to step 611. If the MAC frame has been received after expiration of the threshold time Tyield or if the sequence number of the MAC frame does not match the stored sequence number, then the control unit 160 may end the handover procedure as to the current MAC frame. If the sequence number of the MAC frame does not match the stored sequence number, then the control unit 160 updates the stored sequence number with the sequence number of the current MAC frame.

The control unit 160 determines whether the integrity failure count exceeds a maximum allowed number of failures and determines whether the retransmission count exceeds a maximum allowed number of retransmissions at step 611. If the integrity failure count does not exceed the maximum allowed number of failures or if the retransmission count does not exceed the maximum allowed number of retransmissions, then the control unit 160 may end the handover procedure as to the current MAC frame. If the integrity failure count exceeds the maximum allowed number of failures and if the retransmission count exceeds the maximum allowed number of retransmissions, then the control unit 160 performs handover from the WLAN to a WWAN at step 612.

The handover method according to exemplary embodiments of the present invention may be implemented as computer programs and may be stored in various computer readable storage media. The computer readable storage media may store program instructions, data files, data structures and combinations thereof. The program instructions may include instructions developed specifically for the exemplary embodiments of the present invention and existing general-purpose instructions. The computer readable storage media may include magnetic media such as a hard disk and floppy disk, optical media such as a CD-ROM and DVD, magneto-optical media such as an optical disk, and memory devices such as a ROM and RAM. The program instructions may include machine codes produced by compilers and high-level language codes executable through interpreters.

In a feature of exemplary embodiments of the present invention, when channel interference becomes severe during communication with a WLAN, the handover method automatically initiates handover to a WWAN. Hence, the user may continuously receive a communication service.

While the invention has been shown and described with reference to certain exemplary embodiments thereof, it will be understood by those skilled in the art that that various changes in form and details may be made therein without departing from the scope and spirit of the present invention as defined in the appended claims and their equivalents.

What is claimed is:

1. A handover method, the method comprising:
   receiving, by a mobile device, data from a wireless local area network;
   checking integrity of the received data;
   determining, if the received data lacks integrity, whether the received data was received within a preset threshold time from a preset reference time;
   retrieving, if the received data was received within the preset threshold time, an integrity failure count and a retransmission count for the received data from a storage unit; and
   performing, if the integrity failure count exceeds a preset maximum allowed number of failures and if the retransmission count exceeds a preset maximum allowed number of retransmissions, handover from the wireless local area network to a wireless wide area network.

2. The handover method of claim 1, further comprising increasing, if the received data was received within the threshold time, the integrity failure count by one, and updating the reference time with a reception time of the data.

3. The handover method of claim 1, further comprising:
   determining, if the received data has integrity, whether the received data was received within the threshold time and whether data corresponding to the received data was retransmitted by the wireless local area network; and
   increasing, if the received data was received within the threshold time and if the received data was retransmitted by the wireless local area network, the retransmission count by one as to the received data.

4. The handover method of claim 3, wherein the determining whether the data corresponding to the received data has been retransmitted comprises:
   identifying a sequence number of a TCP header in the received data; and
   comparing the identified sequence number with a previous sequence number that is stored and that corresponds to previously received data.

5. The handover method of claim 4, wherein the increasing of the retransmission count by one comprises increasing the retransmission count by one if the identified sequence number equals the previous sequence number.

6. The handover method of claim 1, wherein the checking of the integrity of the received data comprises checking integrity of a MAC frame in the received data on the basis of a Frame Check Sequence (FCS) of the MAC frame.

7. The handover method of claim 6, wherein the received data is regarded as lacking integrity when the MAC frame lacks integrity.

8. The handover method of claim 1, wherein the checking of the integrity of the received data further comprises checking integrity of an Ethernet frame in the received data on the basis of a Frame Check Sequence (FCS) of the Ethernet frame.

9. The handover method of claim 8, wherein the received data is regarded as lacking integrity when the Ethernet frame lacks integrity.

10. The handover method of claim 1, wherein the reference time is set to a point in time at which a request for data is made, and the reference time is reset to the time of reception of the received data for update when the received data is regarded as lacking integrity.

11. The handover method of claim 1, wherein the wireless local area network is one of a Wi-Fi network and a Bluetooth network.

12. The handover method of claim 1, wherein the wireless wide area network is one of a 3G mobile communication network, a 3.5G mobile communication network and a 4G mobile communication network.

13. A mobile device comprising:
    a wireless communication unit for communicating with a wireless local area network and a wireless wide area network;
    a storage unit for storing an integrity failure count and a retransmission count for data received from the wireless local area network; and
    a control unit for controlling the wireless communication unit for handover from the wireless local area network to the wireless wide area network,
    wherein the control unit controls a process of checking integrity of data received from the wireless local area network, determining, if the received data lacks integrity, whether the received data was received within a preset threshold time from a preset reference time, retrieving, if the data was received within the threshold time, the integrity failure count and the retransmission count for the received data from the storage unit, and performing, if the integrity failure count exceeds a preset maximum allowed number of failures and the retransmission count exceeds a preset maximum allowed number of retransmissions, handover from the wireless local area network to the wireless wide area network.

14. The mobile device of claim 13, wherein the control unit increases, if the received data was received within the threshold time, the integrity failure count by one, and updates the reference time with a reception time of the received data.

15. The mobile device of claim 13, wherein the control unit determines, if the received data has integrity, whether the received data was received within the threshold time and whether the received data was retransmitted by the wireless local area network, and increases, if the received data was received within the threshold time and if the received data was retransmitted by the wireless local area network, the retransmission count by one as to the received data.

16. The mobile device of claim 13, wherein the control unit checks integrity of a MAC frame in the received data on the basis of a Frame Check Sequence (FCS) of the MAC frame.

17. The mobile device of claim 13, wherein the control unit checks integrity of an Ethernet frame in the received data on the basis of a frame check sequence (FCS) of the Ethernet frame.

18. The mobile device of claim 13, wherein the control unit sets the reference time to a point in time at which a request for data is made, and resets the reference time to the time of reception of the received data for update when the received data is regarded as lacking integrity.

19. The mobile device of claim 13, wherein the wireless local area network is one of a Wi-Fi network and a Bluetooth network and the wireless wide area network is one of a 3G mobile communication network, a 3.5G mobile communication network, and a 4G mobile communication network.

20. A handover method, the method comprising:
receiving, by a mobile device, data from a wireless local area network;
determining whether the received data lacks integrity based on a comparison of at least two fields of the received data;
determining whether the received data was received within a preset threshold time from a preset reference time;
retrieving, if the received data lacks integrity and if the received data was received within the preset threshold time, an integrity failure count and a retransmission count for the received data from a storage unit; and
performing, if the integrity failure count exceeds a preset maximum allowed number of failures and if the transmission count exceeds a preset maximum allowed number of retransmissions, a handover from the wireless local area network to a wireless wide area network.

\* \* \* \* \*